United States Patent
Dumond et al.

(10) Patent No.: US 9,138,977 B2
(45) Date of Patent: Sep. 22, 2015

(54) PROCESS FOR FORMING A LAMINATED STRUCTURE

(75) Inventors: Jarrett Dumond, Singapore (SG); Hong Yee Low, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 13/635,655

(22) PCT Filed: Mar. 15, 2011

(86) PCT No.: PCT/SG2011/000103
§ 371 (c)(1),
(2), (4) Date: Sep. 17, 2012

(87) PCT Pub. No.: WO2011/115577
PCT Pub. Date: Sep. 22, 2011

(65) Prior Publication Data
US 2013/0011626 A1    Jan. 10, 2013

Related U.S. Application Data

(60) Provisional application No. 61/313,939, filed on Mar. 15, 2010.

(51) Int. Cl.
| | | |
|---|---|---|
| B82Y 40/00 | (2011.01) | |
| B32B 38/06 | (2006.01) | |
| B29C 65/00 | (2006.01) | |
| B82Y 20/00 | (2011.01) | |
| B82Y 30/00 | (2011.01) | |

(52) U.S. Cl.
CPC ........... *B32B 38/06* (2013.01); *B29C 66/91943* (2013.01); *B29C 66/91945* (2013.01); *B82Y 20/00* (2013.01); *B82Y 30/00* (2013.01); *B82Y 40/00* (2013.01); *B32B 2309/02* (2013.01); *B32B 2309/04* (2013.01); *B32B 2309/105* (2013.01); *B32B 2309/12* (2013.01); *B32B 2457/206* (2013.01); *Y10T 156/1039* (2015.01); *Y10T 428/2462* (2015.01); *Y10T 428/2998* (2015.01)

(58) Field of Classification Search
None
See application file for complete search history.

(56) References Cited

U.S. PATENT DOCUMENTS

| | | | | |
|---|---|---|---|---|
| 5,772,905 A | * | 6/1998 | Chou | ............................... 216/44 |
| 7,186,352 B2 | * | 3/2007 | Morse et al. | .................... 216/67 |
| 7,419,764 B2 | * | 9/2008 | Park et al. | ..................... 430/296 |
| 8,465,655 B1 | * | 6/2013 | Sun et al. | ......................... 216/11 |

(Continued)

FOREIGN PATENT DOCUMENTS

| | | | |
|---|---|---|---|
| JP | 2003270417 A | * | 9/2003 |
| WO | WO 2007089050 A1 | * | 8/2007 |

OTHER PUBLICATIONS

Guo, L. J. et al, "Fabrication of Size-Controllable Nanofluidic Channels by Nanoimprinting and Its Application for DNA Stretching" Nano Letters 2004, 4 (1) 69-73, published on web Dec. 3, 2003.*

(Continued)

*Primary Examiner* — Anita Alanko
(74) *Attorney, Agent, or Firm* — Conley Rose, P.C.

(57) ABSTRACT

There is provided a process for forming a laminated structure, the process comprising the step of bonding a polymer film to an array of structures disposed on a substrate, and wherein a plurality of cavities are formed between the polymer film and the array of structures during the bonding.

19 Claims, 4 Drawing Sheets

(56) References Cited

U.S. PATENT DOCUMENTS

| | | | | |
|---|---|---|---|---|
| 2003/0017305 | A1* | 1/2003 | Roitman et al. | 428/156 |
| 2003/0209314 | A1* | 11/2003 | Guo et al. | 156/247 |
| 2004/0126547 | A1* | 7/2004 | Coomer | 428/209 |
| 2005/0011873 | A1* | 1/2005 | Withford et al. | 219/121.69 |
| 2007/0059497 | A1* | 3/2007 | Huang et al. | 428/195.1 |
| 2007/0077325 | A1* | 4/2007 | Yu | 425/385 |
| 2007/0252164 | A1* | 11/2007 | Zhong et al. | 257/98 |
| 2009/0115094 | A1* | 5/2009 | Chou et al. | 264/219 |
| 2010/0304306 | A1* | 12/2010 | Blanco Barro et al. | 430/319 |
| 2011/0061884 | A1* | 3/2011 | Wang et al. | 174/50.5 |

OTHER PUBLICATIONS

Yang, B. et al "Multiple level nanochannels fabricated using reversal UV nanoimprint" JVST B 2006, 24, 2984-2987, Nov. 30, 2006.*

Park, K.D. et al "Arbitrary-shaped nanochannels fabricated by polymeric deformation to achieve single DNA stretching" Microelectronic Engr 2009, 86, 1385-1388, available onlin Feb. 11, 2009.*

Blanco, F J et al, "Novel three-dimensional embedded SU-8 microchannels fabricated using a low temperature full wafer adhesive bonding" Jun. 4, 2004, J. Micromech. Microengr. 14, 1047-1056.*

* cited by examiner

PROCESS FOR FORMING A LAMINATED STRUCTURE

TECHNICAL FIELD

The present invention generally relates to a process for forming a laminated structure.

BACKGROUND

Nano-structures have been used in a variety of applications such as in electrical, optical, photonic and biological applications. Nano-structures are usually formed on a substrate by way of photo lithography, nano-imprint lithography, reverse imprinting or electron beam lithography.

In order to protect the nano structures from dust and damage, a laminate film can be applied on top of the nano-structures.

In conventional lamination, an adhesion film is usually required to adhere the laminate film to the article to be laminated. The adhesion film will then require heat or pressure in order to adhere the laminate film to the article. Hence, this process requires an additional adhesion film to be attached to the laminate film, requiring an additional manufacturing step to apply the adhesion film to the laminate film.

Another known method for applying a laminate film on top of a series of nano-imprints uses a roll lamination method in which a lamination film is unwounded from a lamination roll and then pressed to the nanostructured surface using a pinch roller. Due to the use of the pinch roller, the lamination film is pressed onto the nanostructures under pressure. While the lamination film is adhered to the nanostructures, this method requires additional equipment such as a pinch roller to carry out the lamination process. Further, it is not certain that the integrity of the nano-imprints is preserved after passing through the pinch roller due to the small scale of the nanofeatures and the pressure involved. This process will also fill in the nanofeatures. There is no control over the infiltration of the polymer laminate into the nanofeatures.

There is a need to provide laminating process that overcomes, or at least ameliorates, one or more of the disadvantages described above.

There is a need to provide laminated structure that overcomes, or at least ameliorates, one or more of the disadvantages described above.

SUMMARY

According to a first aspect, there is provided a process for forming a laminated structure, the process comprising the step of bonding a polymer film to an array of structures disposed on a substrate, and wherein a plurality of cavities are formed between said polymer film and said array of structures during said bonding.

Advantageously, the array of structures promotes the formation of the cavities therein. By selecting the distance between adjacent structures, the shape and size of the cavities may be adjusted accordingly. It is to be appreciated that the cavities may be in the form of channels, chambers or holes which are dependent on the shape and configuration of the array of structures.

The cavities may be enclosed between the array of structures and the polymer film. The enclosed cavities may contain a material therein. The material may be a fluid such as a liquid or gas. More advantageously, the cavities may be used to contain air. In another embodiment, vacuum may be introduced into one or more of the cavities such that the laminated structure may preserve atomic force microscopy tips by means of vacuum.

The cavities may have an opening for permitting material to flow therein. The cavities may have another opening for permitting material to flow therethrough. Hence, the cavities may function as channels for the passage of a material from one opening to another.

Advantageously, the polymer film may be placed on top of the array of structures without filling in the cavities present between adjacent structures. Hence, the integrity of the array of structures and the cavities in between each structure may be preserved.

Advantageously, the disclosed process enables precise control of the extent of infiltration of the laminate film on the structure. Advantageously, the disclosed process enables the transfer of a laminate film onto a structure at high transfer yields. In one embodiment, the bonding step comprises the step of manipulating the temperature and optionally at least one of pressure and time in order to bond the polymer film to the substrate. Advantageously, by controlling the temperature and optionally at least one of pressure and time, the degree of infiltration of the polymer film into the structures can be controlled.

In one embodiment, the polymer film is a polymer laminate film.

Advantageously, due to the layer of polymer film on top of the array of structures, the exposed surface of the polymer film may allow for the planarization of the structure such that additional thin films or patterns can be placed on top of the polymer film in a homogeneous manner. In one embodiment, the process optionally excludes the step of using an additional adhesive layer to bond the polymer laminate film to said structured substrate.

According to a second aspect, there is provided a laminated structure comprising a polymer film containing polymer chains that are at least partially bonded with an array of structures disposed on a substrate and wherein a plurality of cavities are provided between the polymer film and the structures.

According to a third aspect, there is provided a photonic crystal comprising a polymer film containing polymer chains that are at least partially bonded with an array of structures disposed on a substrate and wherein a plurality of cavities are provided between the polymer film and the structures.

DEFINITIONS

The following words and terms used herein shall have the meaning indicated:

The phrases "bonding" and "bonded" as used herein refers generally to the diffusion of the polymer chains from the polymer laminate into the structured substrate such that the diffused polymer chains entangle with the polymer chains of the structured substrate. This diffusion and entanglement of the polymer chains take place at the interface between the polymer laminate and the structured substrate. The term "glass transition temperature" ($T_g$) is to be interpreted to include any temperature of a polymer at which the polymer lies between the rubbery and glass states. This means that above the $T_g$, the polymer becomes rubbery and can undergo elastic or plastic deformation without fracture. Above this temperature, such polymers can be induced to flow under pressure. When the temperature of the polymer fails below the $T_g$, generally, the polymer will become inflexible and brittle such that it will break when a stress is applied to the polymer. It should be noted that the $T_g$ is not a sharp transition temperature but a gradual transition and is subject to some variation depending on the experimental conditions (e.g., film thickness, tacticity of the polymer, etc.). The actual $T_g$ of a polymer film will vary as a function of film thickness. The $T_g$ will be defined herein as being the bulk glass-transition temperature of the polymer substrate. The bulk glass transition temperature is a specific value that is widely agreed upon in the literature. Glass transition temperature values of polymers may be obtained from *PPP Handbook*™ software edited by Dr D. T. Wu, 2000.

The term "ultra-thin" as used in the context of the specification is to be interpreted broadly to, unless specified, relate to an average film thickness of less than 50 nm, and particularly from about 10 nm to about 50 nm.

The terms "nano" and "nano-scale" as used in the context of the specification is to be interpreted broadly to, unless specified, relate to an average size of between about 1 nm to about 100 nm.

The term "infiltration" as used in the context of the specification refers to the physical transfer of the polymer film into the protrusions of the structures, such that the polymer film permeates into the protrusions.

The term "control", and grammatical variants thereof, as used in the context of the specification when referring to infiltration generally means that a known amount of polymer film may infiltrate the array of structures by manipulating the process conditions of the bonding step such as temperature, pressure and time. Alternatively, controlling the extent of infiltration may also refer to achieving a desired degree of infiltration by manipulating the process conditions of the bonding step.

The term "array" generally refers to multiple numbers of structures distributed within an area and spaced apart, unless otherwise indicated.

The terms "ordered array" or "ordered pattern" generally refers to the placement of elements in a specified or predetermined pattern where the elements have distinct spatial relationships to one another. Hence, the terms "ordered array" or "ordered pattern" generally refer to structures distributed within an area with distinct, specified or predetermined spatial relationships to one another. For example, the spatial relationships within an ordered array or ordered pattern may be such that the structures are spaced apart from one another by generally equal distances. Other ordered arrays or ordered patterns may use varying, but specified or predetermined spacings.

The term "transfer yield" in the context of the specification is defined as percentage of useful area wherein the polymer film has transferred onto the structured substrate without completely filling in the array of structures or, alternatively, by infiltrating into the array of structures by a controlled amount. For example, if the starting area before lamination is a 1 cm×1 cm area of structures, and 80% of the 1 cm×1 cm area has been successfully laminated as previously described, then the transfer yield is 80%. However, if the lamination fails over a certain area, or if the structures are filled in over a certain area, then the transfer yield is reduced.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the seated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5 , and 6. This applies regardless of the breadth of the range.

DETAILED DISCLOSURE OF EMBODIMENTS

Exemplary, non-limiting embodiments of a process for forming a laminated structure will now be disclosed.

The process comprises the step of bonding a polymer film to an array of structures disposed on a substrate, and wherein a plurality of cavities are formed between the polymer film and the array of structures during the bonding step. Advantageously, the disclosed process enables precise control of the extent of infiltration of the polymer film on the structured substrate. Advantageously, the disclosed process enables the transfer of a polymer film onto a structured substrate at high transfer yields.

Advantageously, the polymer film may be placed on top of the array of structures without filling in the cavities present between each structure. Hence, the integrity of the structures and the cavities in between each structure may be preserved.

More advantageously, due to the layer of polymer film on top of the structured substrate, the exposed surface of the polymer film may allow for the planarization of the structured substrate such that additional thin films or patterns can be placed on top of the polymer film in a homogeneous manner.

The cavities may be defined by enclosed walls for containing a material therein. The cavities may have an opening for permitting material to flow therein. The cavities may have another opening for permitting material to flow therethrough. The plurality of cavities may have an ordered pattern throughout the laminated structure.

In one embodiment, the process comprises the step of undertaking the bonding step under conditions to cause the polymer chains in the polymer film to at least partially diffuse into said structured substrate.

The bonding step may comprise the step of selecting the condition from a temperature below the glass transition temperature (Tg) of said thermoplastic polymer.

The bonding step may be conducted at a temperature around the Tg of the polymer film. The range of temperatures of the bonding step may be selected from the group consisting of about 20° C. below Tg to about 10° C. above Tg, about 20° C. below Tg to about 15° C. below Tg, about 20° C. below Tg to about 10° C. below Tg, about 20° C. below Tg to about 5° C. below Tg, about 20° C. below Tg to Tg, about 20° C. below Tg to about 5° C. above Tg, about 15° C. below Tg to about 10° C. above Tg, about 10° C. below Tg to about 10° C. above Tg, about 5° C. below Tg to about 10° C. above Tg, Tg to about 10° C. above Tg and about 5° C. above Tg to about 10° C. above Tg.

Advantageously, the temperature chosen for the bonding step enables precise control of the amount of polymer film that infiltrates into the structured substrate.

The bonding step may comprise the step of selecting the condition from a pressure selected from the range consisting of about 40 bars to about 60 bars, about 45 bars to about 60 bars, about 50 bars to about 60 bars, about 55 bars to about 60 bars, about 40 bars to about 45 bars, about 40 bars to about 50 bars and about '10 bars to about 55 bars. It is to be noted that the pressure is the driving force that causes the polymer chains from the polymer laminate to move in a preferred direction. Hence, by changing the pressure, the rate of movement in the preferred direction will change accordingly. Therefore, the pressure may be selected in order to control the infiltration of the polymer laminate into the structures.

The bonding step may comprise the step of selecting the condition from a time duration selected from the range consisting of about 150 seconds to about 300 seconds, or about 150 seconds to about 250 seconds, or about 150 seconds to about 200 seconds, or about 200 seconds to about 300 seconds, or about 250 seconds to about 300 seconds. However, it is to be noted that the above is merely a general range for the time duration. The bonding time may increase depending on the Young's Modulus of the polymer film.

The bonding may cause the polymer film to infiltrate the array of structures by a distance selected from the range consisting of 0 to 200 microns.

In one embodiment, the polymer film abuts the structured substrate. Specifically, in this embodiment, the polymer film has an infiltration distance of 0 nm. In this embodiment, the lamination temperature is about 10° C. lower than the Tg of the polymer film. In this embodiment, the lamination pressure is 50 bars and the duration of the bonding step is 150 seconds.

In another embodiment, the polymer film infiltrates into the array of structures. The polymer film may infiltrate into the array of structures in a range of about 1 nm to about 200 microns, or about 1 nm to about 150 microns, or about 1 nm to about 100 microns, or about 1 nm to about 50 microns, or about 1 nm to about 10 microns, or about 1 nm to about 1 micron, or about 1 nm to about 800 nm, or about 1 nm to about 600 nm, or about 1 nm to about 400 nm, or about 1 nm to about 150 nm, or about 1 nm to about 100 nm, or about 1 nm to about 50 nm, or about 1 nm to about 40 nm, or about 1 nm to about 30 nm, or about 1 nm to about 20 nm, or about 1 nm to about 10 nm, or about 1 nm to about 5 nm, or about 5 nm to about 200 nm, or about 10 nm to about 200 nm, or about 20 nm to about 200 nm, or about 30 nm to about 200 nm, or about 40 nm to about 200 nm, or about 50 nm to about 200 nm, or about 100 nm to about 200 nm, or about 150 nm to about 200 nm, or about 400 nm to about 200 microns, or about 600 nm to about 200 microns, or about 800 nm to about 200 microns, or about 1 micron to about 200 microns, or about 10 microns to about 200 microns, or about 50 microns to about 200 microns, or about 100 microns to about 200 microns, or about 150 microns to about 200 microns.

In one embodiment, the polymer film infiltrates into the structured substrate in a range of about 0 to about 200 nm, or 5 to about 20 nm, or about 10 nm to about 20 nm. Advantageously, by selecting an infiltration distance less than or equal to about 200 nm, a uniform infiltration across the array of structures may be achieved. Hence, at any point along the array of structures, the infiltration distance may be substantially the same.

The higher the temperature chosen for the laminating step, the higher the rate of infiltration of the polymer film into the structured substrate. Advantageously, at a temperature of about 10° C. lower than Tg, polymer chains at the surfaces of the polymer film start gaining enough energy to become mobile, and are thus able to infiltrate and form entanglements with polymer chains of the structured substrate at a slow enough rate to be controllable. At temperatures well above the Tg of the thermoplastic polymer laminate, the infiltration rate of said laminate into the structured substrate would be too high to precisely control. Therefore, temperatures near the Tg (in the range of 20° C. below Tg to 10° C. above Tg) of the thermoplastic polymer laminate must be used to control the infiltration rate.

The infiltration and entanglement between the polymer chains of the polymer film and structured substrate may enable a high transfer yield of the polymer film onto the structured substrate. More advantageously, the high transfer yield is achieved without the use of an additional adhesive layer to bond the polymer film onto the structured substrate. However, the precise value of the transfer yield depends on the materials selected, feature geometries, bonding surface area and processing steps utilized.

The infiltration rate may be very fast, perhaps on the order of the height of the substrate features. For example, if the substrate feature height is 100 nm, the infiltration rate could be 100 nm/second. However, if the infiltration rate is well above the feature height of the structured substrate, precise long-range control of the extent of infiltration may not be achieved.

After the bonding step, the formed laminated structure may then be cooled to a temperature far below Tg.

The process may further comprise the step of selecting a thermoplastic polymer as the polymer film. The polymer film may be a laminate film. The laminate film may comprise of a thermoplastic polymer. Exemplary thermoplastic polymers may be selected from the group consisting of poly(methyl methacrylate), polycarbonate, polystyrene, cycloolefinpolymer, polyimide, poly(p-phenylene vinylene)s (PPV), poly (naphthalene vinylene)s (PNVs), polyfluorenes, polythiophenes, oligothiophenes, poly-p-phenylenes, poly (phenylene ethynylene)s, substituted polyacetylenes, poly (pyridine)s, oxadiazoles, chemical derivatives thereof, and combinations thereof. In one embodiment, the thermoplastic polymer is poly(methyl methacrylate) (PMMA). The polymer may be a light emitting and conductive polymer. The polymer may be a spin-coatable thermoplastic polymer.

The thermoplastic polymer may be coated on a base substrate. Specifically, the thermoplastic polymer may be spin-coated on the surface of a base substrate. In one embodiment, the base substrate is treated to reduce its surface energy, thereby encouraging the film to transfer onto the imprint patterned film. The base substrate may be treated with phenethylmethyldichlorosilane (PEDS).

The base substrate chosen may have an extremely flat surface, where the surface has a minimal thickness variation. The average surface roughness of the extremely flat surface may be 10 nm per unit area or less. To achieve an extremely flat surface, the base substrate may be treated with a mixture of hydrogen peroxide and sulphuric acid, thereby removing any particles on the surface. Alternatively, the base substrate may be cleaned using ultrasonication in an organic solvent. In one embodiment, the base substrate is a silicon wafer. The silicon wafer may be a double-sided polished silicon wafer. Advantageously, the laminate film retains the flat surface of the wafer even after lamination.

The process may comprise the step of selecting the thickness of the polymer laminate film from the range consisting of 10 nm to 10 mm. The polymer film may have a thickness of about 10 nm to about 5 mm, or about 10 nm to about 1 mm, or about 10 nm to about 100 µm, or about 10 nm to about 10 µm, or about 10 nm to about 5 µm, or about 10 nm to about 1 µm, or about 10 nm to about 500 nm, or about 10 nm to about 100 nm, or about 10 nm to about 50 nm, or about 10 nm to about 40 nm, or about 10 nm to about 30 nm, or about 10 nm to about 20 nm, or about 20 nm to about 10 µm, or about 30 nm to about 10 µm, or about 40 nm to about 10 µm, or about 50 nm to about 10 µm, or about 100 nm to about 10 µm, or about 500 nm to about 10 µm, or about 1 µm to about 10 µm, or about 5 µm to about 10 µm, or about 1 mm to about 10 mm, or about 5 mm to about 10 mm.

In one embodiment, the polymer film has a thickness of about 10 nm to about 50 nm. In another embodiment, the polymer film has a thickness of about 500 nm to about 10 nm. In this embodiment, the thicker polymer film may be used for applications in which vacuum is to be introduced into the cavities so that the thicker polymer film can contain and withstand the vacuum without breaking.

Advantageously, the disclosed process enables a large range of polymer film, thickness to be used because the infiltration rate is independent of the polymer film thickness. However, polymer film of a thickness of less than 10 nm may not be suitable to laminate an imprinted resist because a thickness of less than 10 nm is generally below the typical radius of gyration of individual resist molecules.

The process may comprise the step of selecting a thermosetting polymeric substrate as the substrate. Advantageously, the thermosetting polymeric substrate, has a high cross-linking density and can withstand high annealing temperatures of more than 250° C. The thermosetting polymeric substrate may be a photoresist material. The photoresist material may be an epoxy polymer. Exemplary highly cross-linked thermosetting polymeric substrates are Mr-I 9000M available from Micro Resist Technology Gmbh, Germany and SU-8™ resist available from MicroChem Corp. of Newton, Mass., United States of America. In one embodiment, the thermosetting polymeric substrate is Mr-I 9000M.

The substrate may be a cross-linked polymer substrate. In one embodiment, the thermosetting polymeric substrate is a cross-linked polymer substrate. In this embodiment, the cross-linked polymer substrate is a fully cured, structured, polymer substrate.

The thermosetting polymeric substrate may be coated on a supporting substrate. The supporting substrate may be any substrate suitable for coating a thermosetting polymeric substrate thereon. The supporting substrate may be a planar substrate. In one embodiment, the planar substrate is a glass substrate. In another embodiment, the planar substrate is a metal-coated substrate. Any metals that may be thermally evaporated or sputtered onto the substrate may be used. Exemplary metals may include aluminium, copper, nickel, gold, chromium and platinum or alloys thereof. Hence, in one embodiment, the metal-coated substrate may be an Al-coated substrate.

To remove any particles on the surface of the planar substrate, the planar substrate may be treated with a mixture of hydrogen peroxide and sulphuric acid. Alternatively, the planar substrate may be cleaned using ultrasonication.

The structured substrate may further comprise an adhesion promoter to increase the adhesion of the thermosetting polymeric substrate onto the planar substrate. The adhesion promoter may aid to increase the adhesion of the thermosetting polymeric substrate to the planar substrate. In one embodiment, the adhesion promoter is coated onto the planar substrate before the thermosetting polymeric substrate is coated onto the planar substrate.

The process may comprise the step of providing an ordered array of structures on the thermosetting polymeric substrate. The structures may comprise of an array of structures such as holes, channels, trenches, columns, projections, pillars, gratings or combinations thereof. The structures may protrude from the surface of the substrate, such as, for example, columns, projections, pillars and gratings. The structures may not protrude from the surface of the substrate, such as, for example, trenches, holes and channels. The structures may have a dimension in the nano-scale size range. Each structure may have a diameter of about 1 nm to about 200 microns. In one embodiment, each structure may have a diameter of about 1 nm to about 100 nm.

Each structure may have a height of about 5 nm to about 200 microns, or about 5 nm to about 1000 nm. Where the structure is a trench, hole or a channel, the height refers to the depth of the trench, hole or channel.

In one embodiment, the structures in the array are of different dimensions.

In another embodiment, the structures in the array are of the same dimensions. In this embodiment, the array is an ordered array.

The array of structures may have a cross-sectional area less than cross-sectional area of the polymer film.

The process may comprise the step of imprinting the structures on the substrate before the bonding step. The imprinting step may comprise the step of nanoimprinting. Hence, the array of structures may be formed on the structured substrate using nanoimprinting.

The process may comprise the step of forming the structures on the substrate by one of photolithography, e-beam writing and focused ion-beam writing techniques.

In one embodiment, there is provided a laminated structure comprising a polymer film containing polymer chains that are at least partially bonded with an array of structures disposed on a substrate and wherein a plurality of cavities are provided between the polymer film and the structures.

The laminated structure comprises of a polymer film and a structured substrate.

The polymer film may comprise of a thermoplastic polymer. Exemplary thermoplastic polymers may be selected from the group consisting of poly(methyl methacrylate), polycarbonate, polystyrene, cycloolefinpolymer, polyimide, poly(p-phenylene vinylene)s (PPV), poly(naphthalene vinylene)s (PNVs), polyfluorenes, polythiophenes, oligothiophenes, apoly-p-phenylenes, poly(phenylene ethynylene)s, substituted polyacetylenes, poly(pyridine)s, oxadiazoles, chemical derivatives thereof, and combinations thereof. In one embodiment, the thermoplastic polymer is poly(methyl methacrylate) (PMMA). The polymer may be a light emitting and conductive polymer. The polymer may be a spin-coatable thermoplastic polymer.

The substrate may comprise a thermosetting polymer. The substrate may be a cross-linked polymer substrate. In one embodiment, the thermosetting polymer is a cross-linked polymer substrate. In this embodiment, the cross-linked polymer substrate is a fully cured, structured, polymer substrate.

Advantageously, the thermosetting polymeric substrate has a high cross-linking density and can withstand high annealing temperatures of more than 250° C. The thermosetting polymeric substrate may be a photoresist material. The photoresist material may be an epoxy polymer. Exemplary highly cross-linked thermosetting polymeric substrates are Mr-I 9000M available from Micro Resist Technology Gmbh, Germany and SU-8™ resist available from MicroChem Corp. of Newton, Mass., United States of America. In one embodiment, the thermosetting polymeric substrate is Mr-I 9000M.

The polymer film may abut the structured substrate. The polymer film may infiltrate into the array of structures in a range of about 1 nm to about 200 microns, or about 1 nm to about 150 microns, or about 1 nm to about 100 microns, or about 1 nm to about 50 microns, or about 1 nm to about 10 microns, or about 1 nm to about 1 micron, or about 1 nm to about 800 nm, or about 1 nm to about 600 nm, or about 1 nm to about 400 nm, or about 1 nm to about 150 nm, or about 1 nm to about 100 nm, or about 1 nm to about 50 nm, or about 1 nm to about 40 nm, or about 1 nm to about 30 nm, or about 1 nm to about 20 nm, or about 1 nm to about 10 nm, or about 1 nm to about 5 nm, or about 5 nm to about 200 nm, or about 10 nm to about 200 nm, or about 20 nm to about 200 nm, or about 30 nm to about 200 nm, or about 40 nm to about 200 nm, or about 50 nm to about 200 nm, or about 100 nm to about 200 nm, or about 150 nm to about 200 nm, or about 400 nm to about 200 microns, or about 600 nm to about 200 microns, or about 800 nm to about 200 microns, or about 1 micron to about 200 microns, or about 10 microns to about 200 microns, or about 50 microns to about 200 microns, or about 100 microns to about 200 microns, or about 150 microns to about 200 microns.

In one embodiment, the polymer film infiltrates into the structured substrate in a range of about 0 to about 200 nm, or 5 to about 20 nm, or about 10 nm to about 20 nm. Advantageously, by selecting an infiltration distance less than about 200 nm, a uniform infiltration across the array of structures may be achieved. Hence, at any point along the array of structures, the infiltration distance may be substantially the same.

The array of structures may have a dimension in the nanoscale size range.

There is also provided a photonic crystal comprising a polymer film containing polymer chains that are at least partially bonded with an array of structures disposed on a substrate and wherein a plurality of cavities are provided between said polymer film and said structures.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

DETAILED DESCRIPTION OF DRAWINGS

Figure 1:
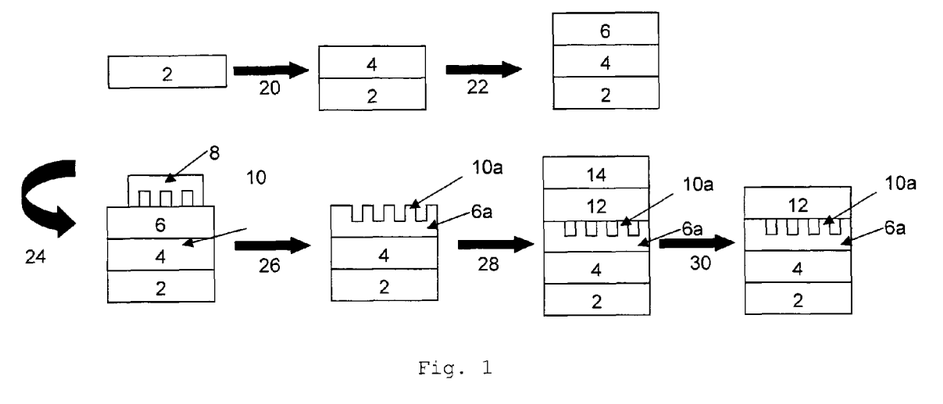
FIG. 1 is a process flow diagram of the nanoimprinting and lamination process according to one disclosed embodiment.

Referring to FIG. 1, there is shown a process flow diagram of the nano-imprinting and lamination process according to one disclosed embodiment.

Here, in the first step depicted by arrow 20, a glass substrate 2 was spun-coated with a layer of an adhesion promoter 4. Before spin-coating, the glass substrate 2 had been prepared by immersing the glass substrate 2 in a corrosive solution of hydrogen peroxide and sulphuric acid and subsequently dried. For substrates which cannot be cleaned with the above corrosive solution, these substrates can be ultrasonicated for two minutes in acetone, followed by two minutes ultrasonication in neutral detergent, two minutes ultrasonication in water and then rinsed in isopropyl alcohol and blown dry.

Following which, a thermosetting polymer 6 in the form of a mr-I 9000M series polymer was spun-coated onto the adhesion promoter layer 4 (as depicted by arrow 22). Then, the coated glass substrate 2 was baked for a sufficient period of time to allow the solvents to evaporate away but without cross-linking the thermosetting polymer 6 prematurely.

An imprint mold 8 having an imprint forming surface 10 made up of a series of protrusions and trenches was then applied on top of the thermosetting polymer 6 of the glass substrate 2 (as depicted by arrow 24). The imprint mold 8 was applied to the thermosetting polymer 6 for a series of imprint temperatures and imprint pressures in order to ensure that a negative replica of the imprint forming surface 10 was transferred to the thermosetting polymer 6. The thermosetting polymer 6 was then cured while the imprint mold 8 was still attached to the glass substrate 2. After imprinting, the imprint mold 8 was removed and any resist residues were removed. After the imprint mold 6 was removed (as depicted by arrow 26), an imprinted thermosetting polymer 6a was formed which consisted of a series of imprint patterns 10a which is opposite to the imprint forming surface 10 of the imprint mold 3. Following the imprinting step, the surface of the imprinted thermosetting polymer 6a was activated using oxygen plasma or UV-ozone in order to improve the adhesion of the imprinted thermosetting polymer 6a to the polymer laminate film 12.

A polymer laminate film 12 than had been spun-coated on a silicon wafer chip 14 was then applied onto the imprinted thermosetting polymer 6a at a selected laminating temperature and pressure (as depicted by arrow 28). Following which, the temperature was cooled down in order to remove the silicon wafer chip 14 from the polymer laminate film 12. Subsequently, as depicted by arrow 30, the assembly consisting of the polymer laminate film 12 on top of the imprint patterns 10a adhered to the glass substrate 2 was obtained.

EXAMPLES

Non-limiting examples of the invention will be further described in greater detail by reference to specific Examples, which should not be construed as in any way limiting the scope of the invention.

Example 1

The process of FIG. 1 was followed here to produce a laminated imprinted structure.

Preparation of Glass Substrate 2

A glass substrate 2 (obtained from Sumitomo Chemical Co., Ltd of Japan) was cleaned using a liquid mixture of hydrogen peroxide and sulphuric acid for 10 minutes. This liquid mixture is extremely corrosive and destroys all organic particles and residues. Following which, the glass substrate 2 was rinsed in water and blown dry with nitrogen gas.

Preparation of Silicon Wafer Chip 14

A silicon wafer chip 14 (obtained from Montco Silicon Technologies, Inc. of San Jose, Calif. of the United States of America) was cut from an ultra-flat 8" DSP wafer with minimum possible total thickness variation. The wafer chip 14 should be larger in area than the patterned area of the imprint mold 8 used to pattern the resist on the glass substrate 2. The same corrosive mixture as above was used to clean the silicon wafer chip 14.

The silicon wafer chip 14 is then immersed in a liquid solution of phenethylmethyldichlorosilane (PEDS, obtained from Alfa-Aesar of Ward Hill, Mass. of the United States of America) in a ratio of approximately 1 ml of PEDS to 25 ml of anhydrous heptane. This solution was prepared in a glove-box to minimize premature reactions by reducing ambient humidity. The silicon wafer chip 14 was immersed in the above solution for 15 minutes, rinsed in heptanes and dried with a cleanroom wiper. By treating the silicon wafer chip 14 with PEDS, this significantly reduces the surface energy of the silicon surface, thus assisting with transfer and lamination of the ultra-thin PMMA laminate film 12 which will be spin-coated on top of the silicon wafer chip 14 as will be described further below.

The surface particles and crosslinked residues on the surface of the silicon wafer chip 14 was removed with a cleanroom wiper and acetone. The silicon wafer chip 14 was then ultrasonicated in acetone to remove excess PEDS. The silicon wafer chip 14 was baked at 150° C. on a hotplate for 5 minutes to remove all solvents.

Preparation of Imprint Mold 8

The imprint mold 8 was prepared by evaporating a self-assembled monolayer (SAM) coating of perfluorodecyltrichorosilane (FDTS, obtained from Alfa-Aesar of Ward Hill, Mass. of the United States of America) on the imprint mold 8 containing an imprint forming surface 10 made up of an 1 cm×1 cm array of 150 nm diameter pillars with 80 nm height. Evaporation of the FDTS was effected by placing the imprint mold 8 in a vacuum desiccator overnight or in a SAM coating machine for several minutes. After deposition of the FDTS, the imprint mold 8 was rinsed with chloroform to remove excess FDTS.

Coating of Glass Substrate 2

An adhesion promoter layer 4 was spun-coated onto the glass substrate 2 (arrow 20). The adhesion promoter layer 4 was made of up of a 2 nm thick Transpin (from Molecular Imprints, Inc. from Texas, Austin of the United States of America) to coat the glass substrate 2. Prior to coating the adhesion promoter layer 4, the glass substrate 2 must be baked on a hotplate at 195° C. for 5 minutes to remove water from the surface. The spin-coating was conducted at 1800 RPM, 1800 R/S for 1 second, and final casting speed was 3000 RPM, 600 R/S for 30 seconds. Following which, the coated substrate was baked at 195° C. for 2 minutes on a hotplate.

After the adhesion promoter layer 4 was spun-coated onto the glass substrate 2, a 380 nm thick layer of mr-I 9000M series polymer (from Micro Resist Technology Gmbh from Berlin of Germany) as the thermosetting polymer 6 was spun-coated on the glass substrate 2 (as depicted by arrow 22). For this, 9100M series resist was used which was 1 μm thick and diluted by 1/3 in anisol by weight. Spreading was conducted at 400 RPM, 400 R/S for 2 seconds. Final casting speed was 4000 RPM, 1000 R/S for 30 seconds. The coated substrate was baked at 100° C. for exactly two minutes on the hotplate to bake out solvents but to avoid cross-linking the resist prematurely. Mr-I 9000M has similar properties to SU-8 in that it has a very high cross-link density and forms a very hard, permanent resist material on the surface of the substrate after it is thermally cured. However, mr-I 9000M has superior imprint performance to SU-8 and better residual layer uniformity.

Coating of Silicon Wafer Chip 14

A 50 nm ultra-thin film of 350 k MW PMMA (1.5% solution in cyclopentanone, obtained from Sigma-Aldrich Corporation of St. Louis. Mo. of the United States of America) as the polymer laminate film 12 was spun-coated on the PEDS coated silicon wafer chip 14. Spreading was conducted at 400 RPM, 400 R/S for 2 seconds, and final coating speed was 2000 RPM, 1000 R/S for 30 seconds. The PMMA coated silicon wafer chip 14 was baked on a hotplate at 150° C. for 5 minutes to bake out solvents.

Imprinting of Thermosetting Polymer 6

The imprint mold 8 having an imprint forming surface 10 as mentioned above is applied onto the surface of the thermosetting polymer 6 coating on the glass substrate 2 (as depicted by arrow 24). The imprint mold 8 is centered on top of the thermosetting polymer 6. The imprint mold should be smaller than the substrate. An Obducat 4" imprinter was used to carry out the imprinting process according to the following recipe:

| Step No. | Temperature (° C.) | Pressure (bars) | Time (seconds) |
| --- | --- | --- | --- |
| 1 | 100 | 60 | 600 |
| 2 | 100 | 15 | 20 |
| 3 | 140 | 15 | 600 |

After the third step, the assembly was removed from the Obducat imprinter immediately with no cool-down.

Post-Imprinting Treatment

After the assembly was removed from the Obducat imprinter, the assembly was annealed in a convection oven a 220° C. to fully cure the mr-I 9000 M while leaving the mold attached to the substrate.

After annealing, the imprint mold 8 was demolded from the thermosetting polymer 6 to reveal the series of imprint patterns 10a on the imprinted thermosetting polymer 6a. Any residue resist material surrounding the imprinted area was also removed. It is to be noted that for the first several imprints with the imprint mold 8, there is a possibility of transferring some FDTS molecules onto the surface of the imprinted thermosetting polymer 6a. These molecules can be removed by ultrasonicating the glass substrate 2 with the fully cured, patterned thermosetting polymer in acetone for 15 minutes after annealing and demolding. If these FDTS residues are not removed, they can significantly impact the transfer yield in during the lamination step (arrow 28).

The imprinted thermosetting polymer 6a was then activated by a brief exposure to oxygen plasma or UV-ozone. Here, a Trion Reactive-Ion Etching (RIE) machine was used and was set at 10 sccm oxygen, 250 mTorr gas pressure, and 25 watts forward power for 2 seconds. This surface activation step will dramatically improve the adhesion of the ultra-thin 350 k MW PMMA film (the polymer laminate file 12) to the mr-I 9000M patterned film (the imprinted thermosetting polymer 6a).

Lamination (or Transfer) Step

The silicon wafer chip 14 coated with the polymer laminate film 12 was placed face down on top of the imprinted thermosetting polymer 6a. The silicon wafer chip 14 should be larger than the imprint area. After loading this assembly into the Obducat 4" imprinter, the following recipe was used:

| Step No. | Temperature (° C.) | Pressure (bars) | Time (seconds) |
| --- | --- | --- | --- |
| 1 | 95-103 | 50-60 | 150-300 |
| 2 | Cool down to 65 | 50-60 | 600 |

It is to be noted that the temperature, pressure and time used in the first step is dependent on the extent of infiltration of the polymer laminate film into the imprinted thermosetting polymer. If no infiltration is desired, then the lower value of the ranges mentioned above for step 1 should be used. However, if partial infiltration is desired, then the higher value of the ranges mentioned above for step 2 should be used.

During the second step, the temperature was decreased but the pressure used should be the same as that used in the first step. By having a lowered temperature in the second step, this is to cool down the whole assembly to a temperature far below the glass transition temperature of PMMA.

Post-Lamination Treatment

After cool-down, the assembly was removed and the silicon wafer chip 14 was detached from the glass substrate 2. Any PMMA residues surrounding the imprinted area was then cleaned with acetone and a cleanroom wiper.

Example 2

The process described above was used to obtain a laminated structure with an ultra-thin PMMA film provided on top of the imprinted mr-I 9000M resist. Here, the laminating temperature used was 95° C., the laminating pressure used was 60 bars and the lamination time was 300 seconds. As this temperature was below the glass transition temperature of bulk PMMA (105° C.), the PMMA film did not deform and infiltrated into the imprinted pattern.

Figure 2A:
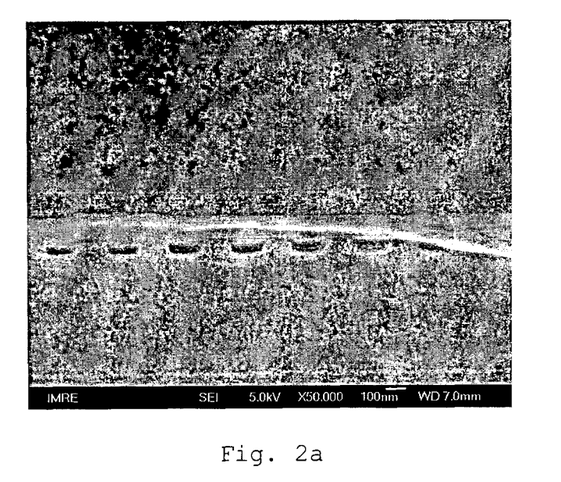
FIG. 2a is a Scanning Electron Microscope (SEM) image at 50,000× magnification showing a heavily cross-linked imprinted resist with 150 nm diameter, 80 nm deep holes with 300 nm pitch and a 50 nm chick 350 k MW PMMA film resting on the top with a ultra-thin layer of Poly(methyl methacrylate) (PMMA) on top.

FIG. 2a is a SEM image of the heavily cross-linked imprinted mr-I 9000M resist with 150 nm diameter, 80 nm deep holes with 300 nm pitch and a 50 nm thick 350 k MW PMMA film resting on the top. The 50 nm thick PMMA film extends out beyond the edge of the imprinted resist which is indicative that the PMMA film rests on top of the imprinted layer but does not actually infiltrate into the imprinted features.

Figure 2B:
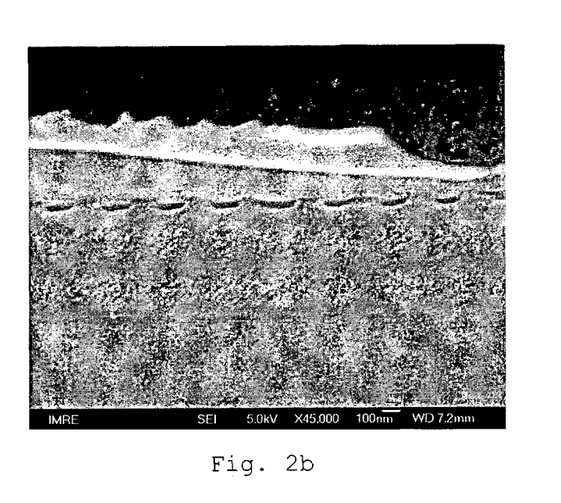
FIG. 2b is a SEM image at 45,000× magnification showing a heavily cross-linked imprinted resist with 150 nm diameter, 80 nm deep holes with 300 nm pitch and a 50 nm thick 350 k MW PMMA on top that extends beyond the edge of the imprinted layer.

A similar result is shown in FIG. 2b where the ultra-thin PMMA film extends even further beyond the edge of the imprinted resist such that the underside of the film can be imaged with reasonable clarity. From FIG. 2b, it is clear that the PMMA film does not infiltrate into the imprinted patterns and the underside of the PMMA film remains undeformed and thus shows no evidence of any infiltration.

From FIG. 2a and FIG. 2b, it can be seen that cavities exist which are bounded by the polymer film and the structures. In FIG. 2a and FIG. 2b, it appears that the PMMA film seems to bend into the imprinted pattern. However, this is believed to be an edge effect caused by the disruption of the PMMA film when the sample was broken for SEM preparation and imaging. In addition, because the imprinted pattern is discrete and in the nano-scale, and the sample was broken by hand, the sample will not break along a line parallel to the discrete features. Therefore, the features in FIG. 2a grew slightly larger in dimension from left to right, due to the orientation of the features not being exactly parallel to the cross-section.

In any case, since these figures were obtained at a lamination temperature of 95° C., which is below the glass transition temperature of bulk PMMA (105° C.), the PMMA film did not deform and infiltrated into the imprinted pattern. This is confirmed by the SEM images depicted in FIG. 2a and FIG. 2b.

Further, FIG. 2a and FIG. 2b confirmed that the integrity and structure of the nano-imprints were preserved even though the PMMA film was applied to the nano-imprints at a high temperature.

Example 3

The process described in Example 1 was used to obtain a laminated structure with an ultra-thin PMMA film provided on top of the imprinted mr-I 9000M resist. Here, the laminating temperature used was 102° C., the laminating pressure used was 50 bars and the lamination time was 150 seconds. As this temperature was only a few degrees below the glass transition temperature of bulk PMMA (105° C.), the PMMA film partially infiltrated into the imprinted pattern.

Figure 3A:
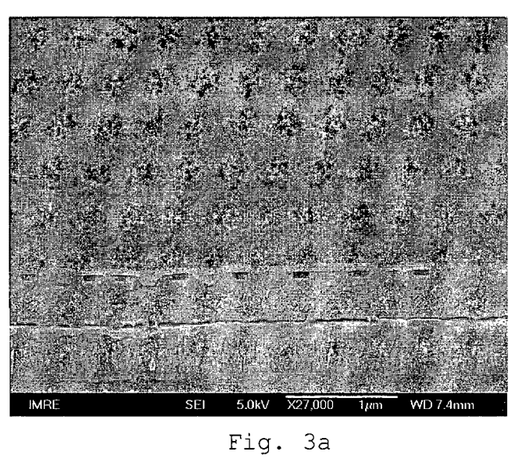
FIG. 3a and FIG. 3b are SEM images at 27,000× and 40,000× magnification, respectively, showing a heavily cross-linked imprinted resist with 150 nm diameter, 80 nm deep holes with 450 nm pitch and a 50 nm thick 350 k MW PMMA film resting on top. In the case of FIG. 3b, the imprinted resist film rests on top of a 400 nm thick aluminium film.
Figure 3B:
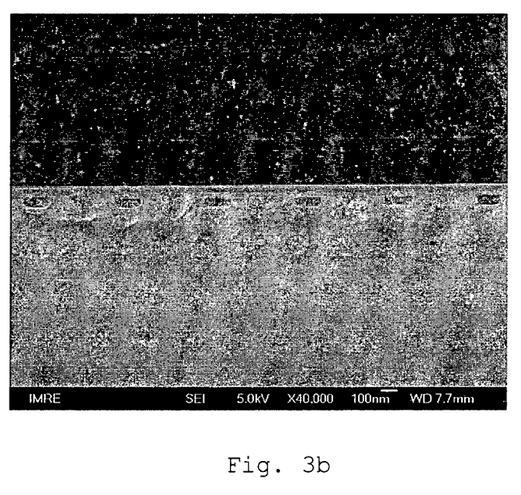

FIGS. 3a and 3b SEM images of a heavily cross-linked imprinted resist with 150 nm diameter, 80 nm deep holes with 450 nm pitch and a 50 nm thick 350 k MW PMMA film resting on the top. Hence, it can be seen from FIGS. 3a and 3b that cavities exist which are bounded by the polymer film and the structures. In the case of FIG. 3b, the imprinted resist film itself rests on top of a 400 nm thick aluminum film. Hence, an aluminium-coated glass substrate (obtained from Sumitomo Chemical Co., Ltd of Japan) was used to form the laminated structure shown in FIG. 3b in place of the glass substrate 2. For both FIGS. 3a and 3b, the substrate used is glass. It is to be noted that the PMMA film was cleaved such that for the most part, it does not extend over the edge of the imprinted resist layer except, to a minor extent, between individual features. This phenomenon is the result of the partial infiltration of the laminated PMMA film into the imprinted features.

On close inspection of the images, especially FIG. 3b, it was observed that the PMMA film did infiltrate about 20 nm into the imprinted holes. These samples were imprinted at ~102° C., which is a few degrees below the bulk glass transition of PMMA. Therefore, it was expected that some deformation of the PMMA film and some infiltration of the PMMA film into the imprinted features would take place and this was confirmed by FIG. 3a and FIG. 3b.

Further, FIG. 3a and FIG. 3b confirmed that the integrity and structure of the nano-imprints were preserved even though the PMMA film had infiltrated into the nano-imprints at a high temperature.

The temperature and the pressure applied during the lamination step can be manipulated to control the degree of infiltration of the PMMA film into the imprinted pattern. In addition, the lamination temperature can be controlled to prevent complete filling of the imprinted pattern by the PMMA film, which would occur if the temperature is raised about one or two degrees above 102° C. Control of this behavior on the nano-scale is a significant accomplishment.

Figure 4:
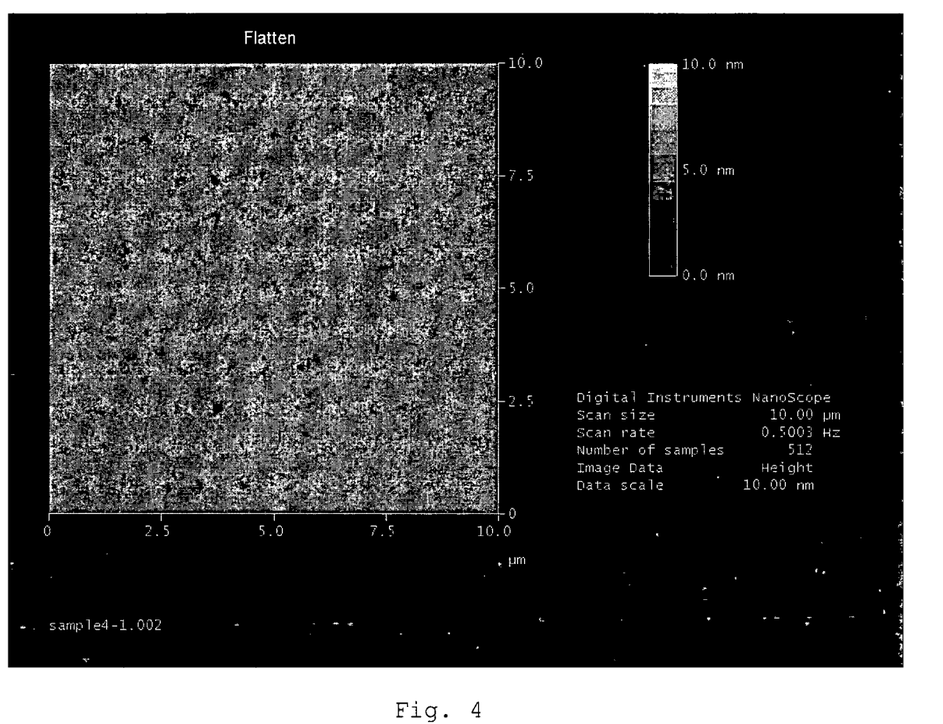
FIG. 4 shows a large area Atomic Force Microscopy (AFM) scan of an externally-facing surface of a laminated 350 k MW PMMA film on top of the cross-linked, nanostructured resist film according to an embodiment of the present invention.

FIG. 4 shows a large area AFM scan of an externally-facing surface of the laminated 350 k MW PMMA film on top of the cross-linked, nanostructured resist film according to this Example. The scan area was 10 µm square. The z-range bar as displayed on the right is 10 nm. The peak-to-trough z-range for this scan is about 2 nm. The troughs can clearly be seen as the imprinted holes underneath the laminated film. It is believed that the laminated PMMA film shows these depressions over the imprinted holes due to some infiltration of the PMMA film into the imprinted holes (volume displacement) in combination with some bending of the laminated PMMA film into the holes because of the low modulus of the ultra-thin PMMA film in suspension.

Nonetheless, the z-range for the scan is only about 2 nm, which is generally negligible for the purposes of device building on top of the imprinted structures underneath. In addition, the RMS roughness of the PMMA film given at 1 µm scan area is only about 0.2 nm. This closely resembles the expected RMS roughness of the 8" DSP wafer chip surface that the PMMA film was spincoated against.

APPLICATIONS

The disclosed process may not require the use of additional equipment in order to carry out the lamination process. The disclosed process may not require an additional adhesion film to be applied to the thermoplastic polymer in order to promote adhesion between the thermoplastic polymer and thermosetting polymer since the adhesion between the two polymers is already promoted by the bonding between the polymer chains present in the two polymers.

The disclosed process may enable the lamination of a structured substrate while preserving the cavities that exist between the array of structures. This is unlike conventional lamination which results in filling in any cavities that are present in between the structures.

The disclosed process to fabricate a laminated structure may be used to planarize a variety of different nano-structured surfaces for applications such as thin film device manufacturing, displays, solar panels, integrated circuits, etc.

For example, a transparent ultra-thin film may be used as the polymer laminate film and since the film would be much thinner than any waveguide modes in the device, the disclosed process may be used to build single- or multi-level air-polymer photonic waveguides with photonic crystals arranged in such a way as to guide light around corners as well as up and down different levels of the device.

The disclosed process may also be used to planarize an array of nanochannels and reservoirs so that a nanofluidic device may be built.

In an embodiment, where the polymer laminate film is a functional material such as a thermoplastic light emitting polymer, the polymer laminate film may be used as part of an organic light emitting device (OLED). For example, one could pattern one or more layers beneath the light emitting polymer (LEP) laminate using nano-imprint lithography, and then transfer the LEP laminate on top of the imprinted patterns using the disclosed process. A cathode metal may then be deposited on top of the LEP laminate to complete an OLED device.

The planarization layer described in an embodiment disclosed herein may also act as a fluid/gas diffusion membrane, which would mediate the diffusion of gas into a fluid, where the polymer laminate film would be impermeable to the fluid but permeable to the gas. An easily discernible application in this instance would be a blood oxygenator where the polymer material and the thickness of the laminate would be chosen to optimize the diffusion of oxygen into blood for patients whose lungs are damaged or otherwise unable to breathe on their own.

In accordance with an embodiment disclosed herein, if a layer of oxide such as silicon oxide is deposited on top of the ultra-thin polymer film under vacuum, it might be possible to retain a vacuum within the nano-scale imprinted features for a long period of time. There may be several commercial applications for this arrangement such as for AFM tips.

Further, the disclosed process may provide an inexpensive process for suspending an ultra-thin laminate film over recessed features. The suspension of ultra-thin laminate films in this manner would enable a variety of scientific studies to directly probe the mechanical properties of said films without interference in the measurement from a supporting substrate. This could perhaps be accomplished using various AFM probing techniques against the suspended regions.

The materials selection, selection of imprint mold to pattern the cross-linked polymer film, the selected thickness of the PMMA laminate, the design of the mold features can all be controlled to achieve application-specific results as discussed above.

The disclosed process may allow the ability to transfer an intact ultra-thin (<50 nm) polymer film and laminate it over a patterned polymer film comprising of nano-scale features, thus generating an all-polymer or all-resist construct with controllable infiltration of the polymer laminate into the nano-scale features. In addition, nano-scale control over the distance set between the sealed features and the external surface of the construct can be achieved simply by adjusting the spin-coating parameters, and thus the resulting thickness, of the polymer laminate.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A process for forming a laminated structure, the process comprising: the step of bonding a thermoplastic polymer film to an array of structures disposed on a substrate under conditions to cause the polymer chains in said polymer film to at least partially infiltrate into said array of structures, wherein said conditions comprise a temperature in the range of about 20 C below the glass transition temperature to about 10 C above the glass transition temperature of said thermoplastic polymer to control the degree of infiltration of said polymer chains into said array of structures, and wherein a plurality of cavities are formed between said polymer film and said array of structures during said bonding.

2. The process as claimed in claim 1, comprising the step of imprinting the structures on the substrate before said bonding step.

3. The process as claimed in claim 1, wherein the cavities are defined by enclosed walls for containing a material therein.

4. The process as claimed in claim 1, wherein the cavities have an opening for permitting material to flow therein.

5. The process as claimed in claim 4, wherein the cavities have another opening for permitting material to flow therethrough.

6. The process as claimed in claim 1, comprising the step of selecting poly(methyl methacrylate) as said thermoplastic polymer.

7. The process as claimed in claim 6, comprising the step of selecting said temperature from the range consisting of 20° C. below said glass transition temperature to the glass transition temperature.

8. The process of claim 1, wherein said conditions further comprise a pressure selected from the range consisting of 40 bars to 60 bars.

9. The process of claim 1, comprising wherein said conditions further comprise the step of selecting said condition from a time duration selected from the range consisting of 150 seconds to 300 seconds.

10. The process as claimed in claim 1, comprising the step of providing an ordered array of structures on a planar substrate.

11. The process as claimed in claim 1, wherein the plurality of cavities have an ordered pattern throughout the laminated structure.

12. The process as claimed in any one of the preceding claims, wherein said bonding causes said polymer laminate film to infiltrate said array of structures by a distance selected from the range consisting of 1 nm to 200 microns.

13. The process as claimed in claim 12, wherein the infiltration distance is selected from the range consisting of 10 nm to 20 nm.

14. The process as claimed in claim any one of claims 1-11, comprising the step of selecting the thickness of said polymer laminate film from the range consisting of 10 nm to 10 millimeters.

15. The process as claimed in any one of claims 1-11, comprising the step of selecting said array of structures having a dimension on the nano-scale size range.

16. The process as claimed in claim 2, wherein the imprinting step comprises nanoimprinting.

17. The process as claimed in claim 1, comprising, before the bonding step, the step of forming the structures on the substrate using a technique selected from the group consisting of photolithography, e-beam writing and focused ion-beam writing.

18. The process as claimed in any one of claims 1 to 11 and 16 to 17, comprising the step of selecting a thermosetting polymeric substrate as said substrate.

19. The process as claimed in claim 1, comprising the step of selecting as said substrate, a cross-linked polymer substrate.

* * * * *